Dec. 16, 1941.  C. R. RANEY  2,266,567
STRAW DEFLECTOR FOR COMBINES
Filed July 8, 1939  2 Sheets-Sheet 1

INVENTOR
CLEMMA R. RANEY
BY Paul O. Pippel
ATTY.

Dec. 16, 1941.  C. R. RANEY  2,266,567
STRAW DEFLECTOR FOR COMBINES
Filed July 8, 1939   2 Sheets-Sheet 2

INVENTOR
CLEMMA R. RANEY
BY Paul O. Pippel
ATT'Y

Patented Dec. 16, 1941

2,266,567

UNITED STATES PATENT OFFICE 2,266,567

STRAW DEFLECTOR FOR COMBINES

Clemma R. Raney, Riverside, Ill., assignor to International Harvester Company, a corporation of New Jersey Application July 8, 1939, Serial No. 283,452

2 Claims. (Cl. 56—122)

This invention relates to a harvester thresher. More specifically it relates to a straw chute for the thresher part thereof.

Certain types of traveling combines comprise a thresher body with a straw discharge opening at one end, a header or harvester at one side of the thresher and a ground wheel somewhat beyond the other side of the thresher body. The width of cut by the harvester is such that on one trip across the field being cut the outside wheel follows a line followed by the thresher body on the previous trip and consequently must run through straw discharged by the thresher body on the previous trip. Accordingly, it is desirable to have the straw discharged to one side of the centerline of the thresher body so that the outside wheel will not run through the straw.

An object of the present invention is to provide an improved thresher construction.

Another object is the provision of means for guiding straw discharged at the rear of a thresher body to one side of the centerline of the thresher body.

A further object is to provide a chute adapted to be connected to a straw-discharge hood at the rear of a thresher body.

Another object is the connection of a chute to a straw-discharge hood at the rear of a thresher body.

Another object is to provide a chute including a stiffening member which is employed in the connection of the chute to the straw-discharge hood of a thresher body.

According to the present invention, a chute is connected to a downwardly opening straw-discharge hood at the rear of a thresher body. The chute comprises a vertical wall extending from the end of the thresher body and a downwardly and transversely extending wall from the side of the thresher body which receives straw from the hood and discharges it at one side of the centerline of the thresher body.

In the drawings—

Figure 1:
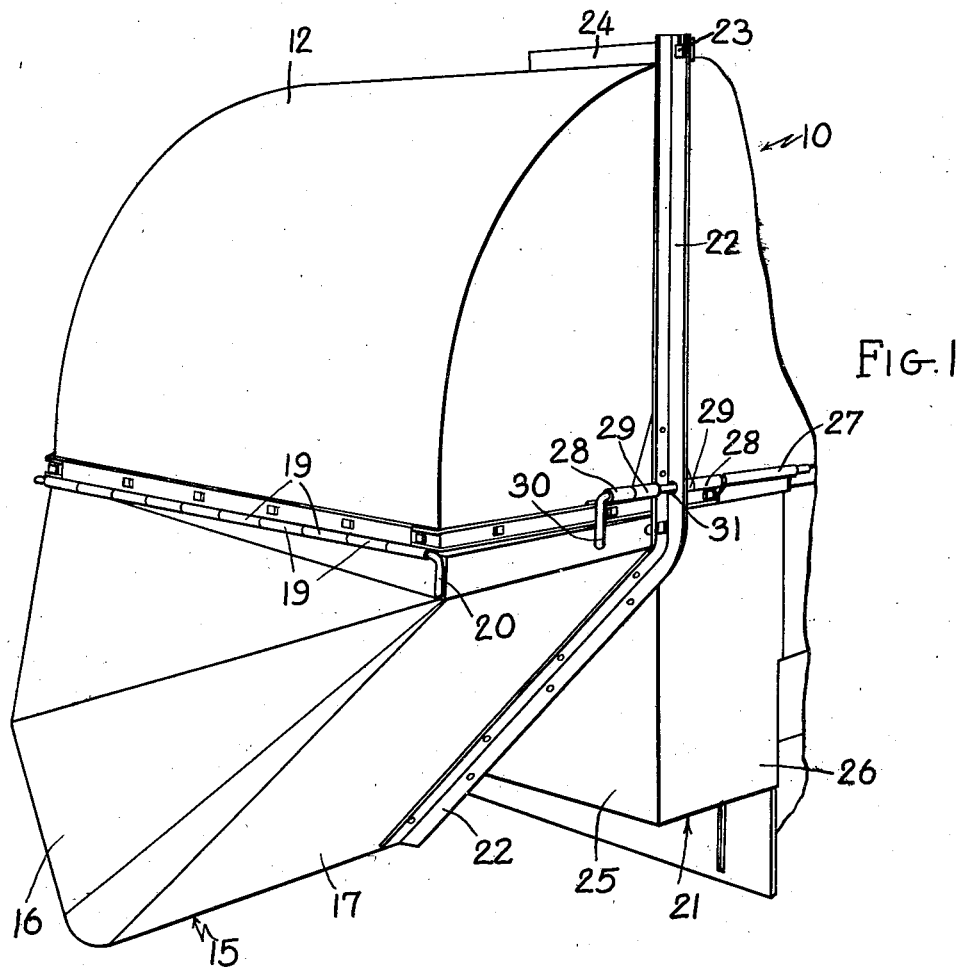
Figure 1 is a view in perspective showing the novel chute of the present invention secured at the rear of a thresher body.
Figure 4:
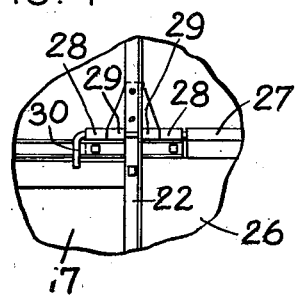
Figure 4 is a detail showing of a portion of the connection between the chute and the thresher body.

The reference numeral 10 designates a thresher body, only the rear portion of which is shown.

Figure 2:
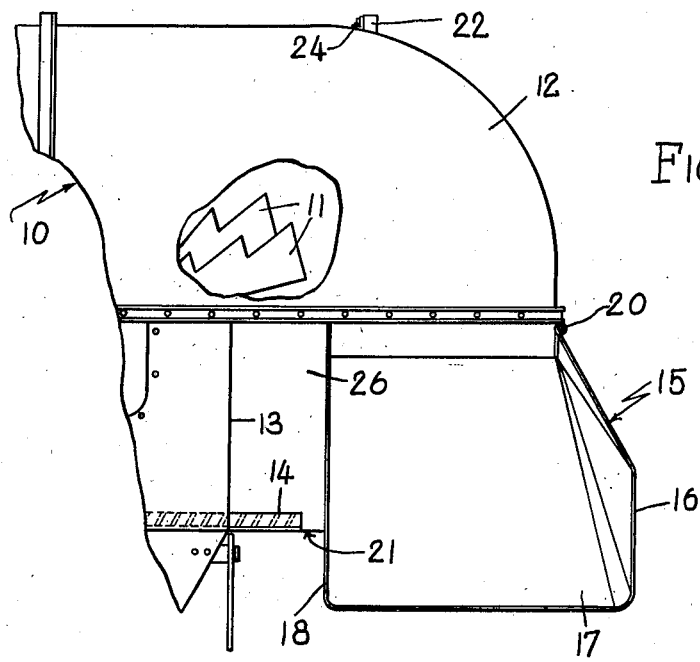
Figure 2 is a side view of the chute joined to the end of a thresher body with part of the thresher body being cut away.
Figure 3:
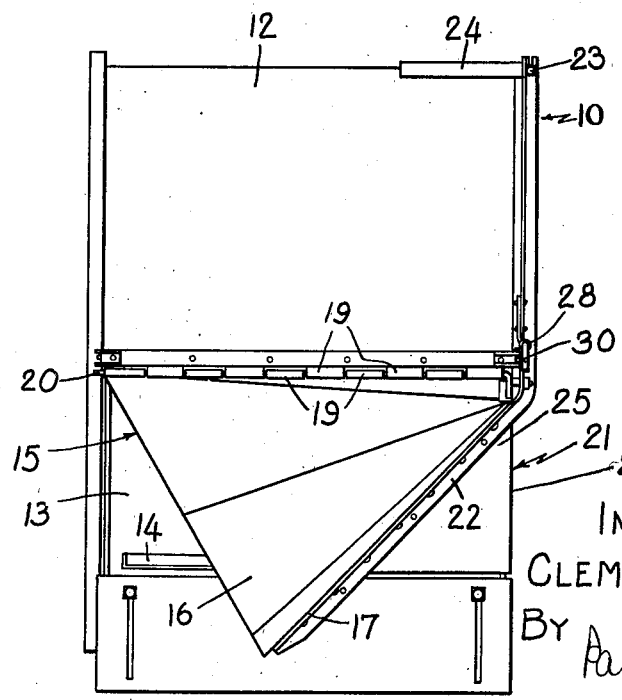
Figure 3 is an end view of the same.

Straw walkers 11 are shown in Figure 2 and beyond them is a downwardly opening straw discharge hood 12. The thresher body is open inwardly of and below the hood 12 as at 13, and a chaffer extension 14 protrudes, which is moved fore and aft so as to feed the straw out the end of the thresher body 10.

A chute 15 is secured to the hood 12, which chute comprises a generally vertical wall 16 extending from and somewhat beyond the end wall of the hood 12 at the end of the thresher body and a wall 17 extending downwardly and transversely of the thresher body from the side of the hood at the side of the thresher body. The wall 17 joins the wall 16 at one side and has an upturned edge 18 at the other side. The wall 16 is connected to the end of the hood by means of short tubular sections 19 secured alternately to wall 16 and the hood 12 and a pin 20 passing through the tubular sections 19. A cover 21 extends from beneath the wall 17, being joined thereto by means of an angle or stiffener member 22 which extends up the side of the hood 12 and is connected at the top thereof by means of a bolt 23 and a member 24 on top of the hood 12. The cover 21 which encloses the chaffer 14, comprises a vertical triangular-shaped wall 25 and a vertical wall 26 extending as a continuation of the side of the thresher body 10, serving to close off the open part inwardly of and beneath the hood which is below the wall 17. The cover 21 and angle member 22 are connected to the side of the thresher body 10 by means of a tubular section 27 secured to the wall 26, tubular sections 28 secured to the side of the thresher body, tubular sections 29 secured to the angle member 22, and a pin 30 passing through the tubular sections and an opening 31 in the angle member 22.

In operation, the thresher body functions in the usual manner which for the purposes of the present invention need not be described. A blast of air from a fan within the thresher causes straw to be discharged from the hood 12, and from the chaffer 14. The straw falls from the straw walkers 11 into the chute 15 and the fore and aft movement of the chaffer extension 14 moves the straw rearwardly onto the chute 15 and is discharged onto the ground with the aid of the wall 17 to one side of the centerline of the thresher body and generally in a windrow. Without the chute 15, the straw would be discharged along the centerline of the thresher body and on both sides thereof. Thus the ground wheel beyond the side of the thresher, by passing along the line followed by the centerline of the thresher body on a previous trip across the field, would run through straw discharged on the previous trip. By the present invention the ground wheel does not run through straw since the straw has been discharged to one side of the centerline of the thresher body.

The chute embodying the present invention may be quickly and easily removed from the thresher body. For removal, the angle member 22 is disconnected from the member 24 by removal of the bolt 23, and pins 20 and 30 are removed, respectively, from tubular sections 19 and tubular sections 27, 28 and 29. The chute 15, cover 21, and angle iron 22 come off as a unit. As previously stated, the purpose of the cap 21 is to cover the open part beneath and inwardly of the hood 12 which is beneath the inclined wall 17 of the chute 15. Consequently, the blast of air which effects the discharge of straw to the hood 12 cannot cause straw to be discharged inwardly of the wall 17 and along the width of the thresher body rather than in a windrow and to one side of the centerline. The angle iron 22 serves to stiffen the chute and to prevent its being bent out of shape during use and when removed from the hood.

It is the intention to limit the invention only within the terms of the appended claims.

What is claimed is:

1. The combination with a thresher body having a downwardly opening straw-discharge hood at one end and being open inwardly of and below the hood, of a device having a first generally vertical wall extending from the side of the hood at the rear of the thresher body, a second wall extending from a side of the hood at the side of the thresher body downwardly and transversely of the thresher body for discharging straw in a windrow at one side of the centerline of the thresher body, a portion extending from beneath the second wall and forming a closure for the part of the opening in the thresher body inwardly of and below the hood, said part being beneath the second wall, means connecting the first wall of the device and the side of the hood at the end of the thresher body and comprising short tubular sections alternately connected to the hood and the wall and a pin passing through the tubular sections, means connecting the side of the hood at the side of the thresher body and the said portion of the device and comprising a tubular portion in the hood and the device and a pin passing through the sections, and an angle member connecting and extending along the juncture of the second wall and the said portion and also extending up the side of the thresher and being secured at the top thereof.

2. The combination with the straw dischargehood of a thresher, of a straw-deflecting chute having a vertical wall, an inclined wall, and a stiffener bar extending along an edge of the inclined wall and the side of the straw-discharge hood and being secured at the top thereof, and means securing the chute to the hood comprising tubular sections secured to the hood and vertical wall, a first pin passing through the sections, and a second pin passing through a tubular section secured to the hood and a hole in the stiffener member.

CLEMMA R. RANEY.